United States Patent Office 3,682,668
Patented Aug. 8, 1972

3,682,668
ORGANIC-INORGANIC SILICATE BINDER
FOR REFRACTORY PROCESSES
Tadao Fujita, Amagasaki, Makoto Wake, Sakai, and Kunihiko Konishi, Osaka, Japan, assignors to Kubota Tekko Kabushiki Kaisha, Osaka-shi, Osaka-fu, Japan
No Drawing. Continuation-in-part of application Ser. No. 851,438, Aug. 19, 1969, which is a continuation-in-part of application Ser. No. 626,740, Mar. 29, 1967. This application June 15, 1970, Ser. No. 46,494
Int. Cl. C09d 1/04; C09j 1/02
U.S. Cl. 106—74
4 Claims

ABSTRACT OF THE DISCLOSURE

Silicic binders are prepared by admixing:
(1) an inorgainic silicate, colloidal silica or a mixture thereof with organic silicate, and
(2) a saturated monohydric alcohol at a pH of between 2.5 and 0.05. The resultant solution is a binder with excellent properties.

The binder of the present invention polymerizes rapidly, has a long shelf life and good heat resistance.

---

This application is a continuation-in-part of Ser. No. 851,438, filed Aug. 19, 1969, now abandoned, which, in turn, is a continuation-in-part of Ser. No. 626,740, filed Mar. 29, 1967, now abandoned.

This invention relates to a silicic binder. As the silicic binder has a refractory property, chemical stability at high temperature, a great binding strength and the like, it is extensively used as a binder in various fields of refractory molded products, such as firebricks, refractory crucibles, investment molds, fireproof and rustless paints and the like.

Known silicic binders comprise inorganic silicate, such as sodium silicate and the like, silica sol (water as dispersion medium), and organic silicate, such as propyl silicate, ethyl silicate and the like.

When these materials are employed, the following methods are known to prepare the binder:

As inorganic silicate: Sodium silicate is used per se.
As colloidal silica:
 (1) Silica sol which is obtained by removing Na ion by means of ion-exchange resin.
 (2) Alcohol substitution is effected with the object of raising the concentration of silica sol obtained in (1).
 (3) Silica sol which is obtained by adding acid to sodium silicate and by making use of the resultant semipermeable membrane.
 (4) A method of substitution with alcohol, acetone or the like with the object of raising the concentration of silica sol obtained in (3).
 (5) Colloidal silica available on the market is used per se.
As organic silicate:
 (1) A hydrolysis solution of orthoethyl silicate.
 (2) A hydrolysis solution of polyethyl silicate.

The invention relates to a binder of a silicate group of a completely original and novel type, which is obtained by a polymerization reaction between inorganic silicate or colloidal silica or a mixture thereof with organic silicate.

In the general process of the binder formation, the reaction between inorganic silicate and organic silicate is prompt, gelatinization occurring instantaneously after the mixing, making it impossible to obtain a solution usable as a binder. This is also the case with organic silicate and colloidal silica which have the same components and properties as those of inorganic silicate.

The binder of the invention is a silicic binder characterized by the process wherein a saturated monohydric alcohol (general formula $C_nH_{2n+1}OH$, where $n=1, 2, 3$ or 4). The pH of which is adjusted to between 2.5 and 0.05 by addition of acid. Alternatively, a mixture of alcohol and acetone may be used as a common solvent, to which are added inorganic silicate or colloidal silica or a mixture thereof with organic silicate, a polymerizing reaction being produced in the mean-time.

As described above, the saturated monohydric alcohol employed in the invention is within the scope of the formula, $n=1, 2, 3$ or 4, methyl alcohol, ethyl alcohol, propyl alcohol and butyl alcohol. As is generally known, the higher the value of $n$, the greater the oiliness of alcohol and the smaller is its water solubility. Therefore, for the method of the invention, in which alcohol is employed as a common solvent of inorganic silicate containing water, amyl alcohol or the like wherein $n=5$ is not usable. Further, it is necessary for the pH of said saturated monohydric alcohol and acetone or a mixture thereof be lowered to a value of between 2.5 and 0.05 by adding acid. The acid employed here comprises inorganic acids, such as hydrochloric acid, sulfuric acid, nitric acid, phosphoric acid and the like. If the pH is higher than 2.5, there is a risk that a mixture of inorganic silicate or colloidal silica and organic silicate will be immediately gelatinized and solidified. On the other hand, below pH 0.05, the hardening of the binder becomes difficult unless a great volume of hardening agent is added. Moreover, shelf life is impaired.

The inorganic silicate employed in the invention comprises potassium silicate or water glass e.g. denatured water glass. Further, colloidal silica which has the same properties as inorganic silicate may also be employed. Colloidal silica mentioned herein is a hydrosol of silicic acid in which super corpuscular silicic anhydride is colloidally dispersed in water. Denatured water glass is an intermediate solution in which sodium silicate is preliminarily denatured with hydrochloric acid, sulfuric acid, nitric acid, phosphoric acid or the like. This solution is used to control the instantaneous gelatinization and solidification as a result of dehydrating reaction of alcohol where used as a common solvent as in case of the use of commonly available sodium silicate. Organic silicates comprise methyl silicate, ethyl silicate, propyl silicate, butyl silicate or the like.

The preferred proportions are as follows:

| | Parts by volume |
|---|---|
| Alcoholic solution | 15–70 |
| Inorganic silicate or silica sol | 5–70 |
| Organic silicate | 10–80 |

The results of repeated experiments have revealed that the appropriate mixing ratio of inorganic silicate and organic silicate is approximately 5:4 in volume ratio in view of the characteristics of the polymerizing reaction.

This is also applicable to colloidal silica used as a substitute for inorganic silicate as well as to a mixture of inorganic silicate and colloidal silica. The invention will be described in further detail hereinunder with reference to the preferred examples. The mixture of each example shows the ratio when 1 l. of binder is to be produced.

EXAMPLE NO. 1

|  | Cc. |
|---|---|
| Inorganic silicate: Denatured water glass | 130 |
| Colloidal silica | 15 |
|  | 145 |
| Organic silicate: Ethyl silicate | 120 |
| Alcohol: |  |
| Ethyl alcohol | 106 |
| Methyl alcohol | 560.25 |
|  | 666.25 |
| Acetone | 68 |
| Acid: Hydrochloric acid | 0.75 |
| Total | 1,000 |

As to denatured water glass, an unstabilized intermediate derivative was obtained by adding 4.3% concentrated hydrochloric acid and 85.7% water to 10% water glass having a mol ratio of 2:1 and specific gravity of 1.4.

According to the foregoing mixture, a binder is obtained by adding hydrochloric acid to the solvent, i.e., alcohol and acetone, so as to lower the pH to a value less than 2.5, the foregoing inorganic silicate, colloidal silica and organic silicate being added thereto and agitated therewith.

EXAMPLE NO. 2

|  | Cc. |
|---|---|
| Inorganic silicate: Denatured water glass | 97 |
| Organic silicate: Ethyl silicate | 80 |
| Alcohol: Methyl alcohol | 822.25 |
| Acid: Sulfuric acid | 0.75 |
| Total | 1,000 |

EXAMPLE NO. 3

|  | Cc. |
|---|---|
| Silica sol: Colloidal silica | 80 |
| Organic silicate: Ethyl silicate | 120 |
| Alcohol: Methyl alcohol | 800 |
| Acid: Sulfuric acid | 2 |
| Total | 1,000 |

In the above examples, the same denatured water glass as that of Example No. 1 was used, and the method of obtaining a binder was also same as that of Example No. 1.

As to the properties of the binder obtained by the foregoing examples, the results as shown in Table 1 were obtained.

TABLE I

| Item sample | Change of viscosity per temperature | Change of viscosity per time | Time of hydrolysis (polymerizing reaction) | |
|---|---|---|---|---|
| | | | Minutes | Hours |
| Example No.: | | | | |
| 1 | No perceptible change up to 85° C. | No perceptible change even after 6 months' storage. | 10 | |
| 2 | do | do | 10 | |
| Conventional Sample. | Remarkable increase in viscosity and gelatinization above 80° C. | Gelatinized after lapse of 2 weeks. | | 12 |

The above conventional sample is a commonly known binder comprising 600 cc. ethyl silicate liquid, 360 cc. industrial denatured alcohol and 400 cc. water, totalling 1,000 cc.

As is evident from the foregoing results, the binder of the invention, as compared with the conventional one which consists chiefly of organic silicate, shows a very smooth polymerizing reaction, i.e. the reaction proceeds in less than 10 minutes, whereas approximately 12 hours is generally necessary in case of the conventional binder as shown in Table I. In addition to this particularly remarkable feature, the binder of the invention is also characterized by its long shelf life and less susceptibility to temperature.

These features are obtainable by the use of the silicate intermediate solution called denatured water glass, which constitutes the most important part of the invention. That is to say, a highly activated unstabilized silicate intermediate solution derived from water glass is used as a medium with which to produce the silicate binder of the invention as illustrated in the foregoing description and the examples. The theoretical basis thereof is as follows.

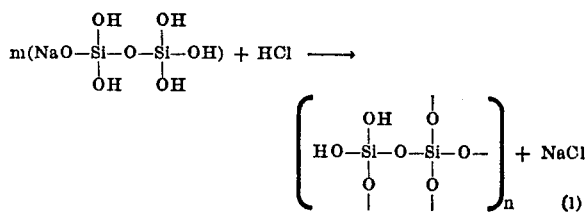

(1)

in which, as intermediate solution:

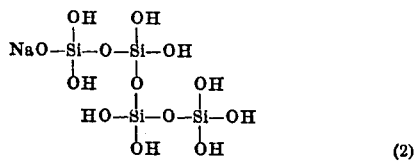

(2)

If Formula No. 1 and Formula No. 2, which latter is an intermediate solution, are caused to react to each other, the resultant binder is extremely unstable and highly activated, with the result that the gelatinization proceeds in an extremely short period of time. However, if organic silicate is polymerized with the intermediate solution at the initial stage of reaction with alcohol as a common solvent, taking advantage of the said high activation, the result is as follows.

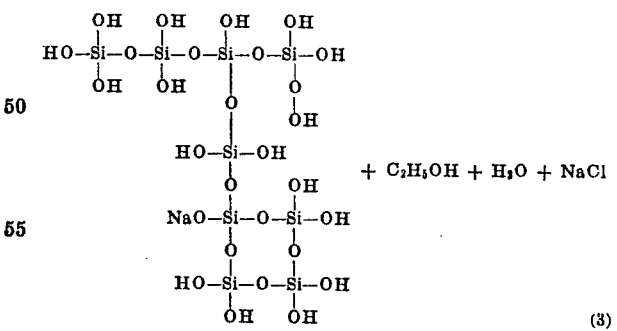

(3)

The binder of this composition (Formula No. 3) is different from the conventional binder (Formula No. 4) obtained by hydrolyzing ethyl silicate.

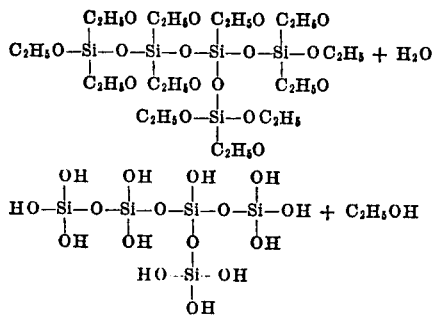

(4)

The binder of Formula No. 3 is not only water soluble but its polymerizing reaction proceeds in several minutes, whereas approximately 12 hours is required in case of Formula No. 4. Therefore, the required binder is obtainable in an extremely short period of time, and moreover in the production of the identical refractory material, the binder of Formula No. 3 can produce the identical result with a smaller quantity as compared with the case of Formula No. 4, as is clear from Table I.

As to the practical utility of the invention, the use of inorganic silicate or a mixture with colloidal silica enables reduction in cost, and the binder which is alcoholphilic and hydrophilic can be diluted with alcohol or water to any required degree of concentration. Furthermore, the binder of the invention can be gelatinized and solidified in any arbitrary period of time by controlling its pH. Therefore, by preparing refractory slurry by adding a granular refractory substance and a basic substance as hardening agents, the binder is applicable for many uses such as precision casting molds, casting molds for general machine castings, lining materials for melting furnaces, lining materials for ladles, noninflammable paints, coating material for casting metal molds and the like.

For the foregoing uses, as compared with the hitherto known inorganic silicate binder and organic silicate binder shown as a conventional sample in Table I, the characteristics of the binder of the invention have been so remarkably improved, its polymerized structure and molecular structure being different, that its strength is greater by approximately three times in terms of $SiO_2$ component at the identical concentration. Moreover, the smooth polymerization reaction in the course of production of the binder helps expedite and facilitate the operation, which is a practically and great advantage.

What is claimed is:

1. A silicic binder obtained by admixing:
   (a) 15–70 parts by volume of an alcoholic solution with a pH of 0.05 to 2.5, said alcohol having the formula $C_nH_{2n+1}OH$, wherein $n=1-4$;
   (b) 5–70 parts by volume of a member selected from the group consisting of a colloidal aqueous solution of silica, potassium silicate and water glass; and
   (c) 10–80 parts by volume or organic silicate selected from the group consisting of ethyl silicate, propyl silicate, and butyl silicate.

2. A silicic binder according to claim 1 wherein the member of (a) is a colloidal aqueous solution of silica.

3. A silicic binder according to claim 1 wherein the member of (a) is water glass.

4. A silicic binder according to claim 1 wherein the member of (a) is potassium silicate.

References Cited

UNITED STATES PATENTS

| | | | |
|---|---|---|---|
| 2,701,902 | 2/1955 | Strachan | 22—196 |
| 2,799,693 | 7/1957 | Dodgson | 106—69 |
| 3,146,252 | 8/1964 | Emblem et al. | 260—448.8 |

JAMES E. POER, Primary Examiner

U.S. Cl. X.R.

106—84